(12) United States Patent
Bhargava et al.

(10) Patent No.: US 12,724,623 B2
(45) Date of Patent: Sep. 1, 2026

(54) METHOD FOR CONFIGURING DEVICE SETTINGS BASED ON USER INTENT

(71) Applicant: Dell Products L.P., Round Rock, TX (US)

(72) Inventors: Vivek Bhargava, Bangalore (IN); Abhishek Mishra, Bangalore (IN); Dinesh Koppada, Bangalore (IN); Balakrishna Reddy Nallavadla, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 80 days.

(21) Appl. No.: 19/024,626

(22) Filed: Jan. 16, 2025

(65) Prior Publication Data

US 2026/0203077 A1 Jul. 16, 2026

(51) Int. Cl.
*G06F 9/445* (2018.01)

(52) U.S. Cl.
CPC .................................. *G06F 9/4451* (2013.01)

(58) Field of Classification Search
CPC ..................................................... G06F 9/4451
See application file for complete search history.

(56) References Cited

U.S. PATENT DOCUMENTS

| | | | | |
|---|---|---|---|---|
| 10,771,517 | B2 * | 9/2020 | Ein-Gil | H04L 67/51 |
| 11,539,765 | B2 * | 12/2022 | Ein-Gil | H04L 67/14 |
| 2018/0007099 | A1 * | 1/2018 | Ein-Gil | H04L 65/403 |
| 2019/0281095 | A1 * | 9/2019 | Ein-Gil | H04L 67/14 |
| 2021/0075836 | A1 * | 3/2021 | Ein-Gil | G06F 9/468 |
| 2023/0275926 | A1 * | 8/2023 | Galli | H04L 63/102 726/1 |
| 2024/0095156 | A1 * | 3/2024 | Sommers | H04L 43/50 |

* cited by examiner

*Primary Examiner* — Jaweed A Abbaszadeh
(74) *Attorney, Agent, or Firm* — Chamberlain, Hrdlicka, White, Williams & Aughtry; Aly Z. Dossa

(57) ABSTRACT

A method for configuring electronic devices includes obtaining a user profile for a user and electronic device information for an electronic device associated with the user. The method also includes determining a circle of interest (COI) using the previously obtained user profile and electronic device information. Further, the method includes presenting, based on the COI, a set of questions to the user. In response to the presenting, the method includes receiving a set of answers from the user and, based on those answers, generating a plurality of tasks. After generating, the method includes validating the plurality of tasks. The method also includes initiating execution of the plurality of tasks on the electronic device, wherein the electronic device is configured after the plurality of tasks are executed.

20 Claims, 8 Drawing Sheets

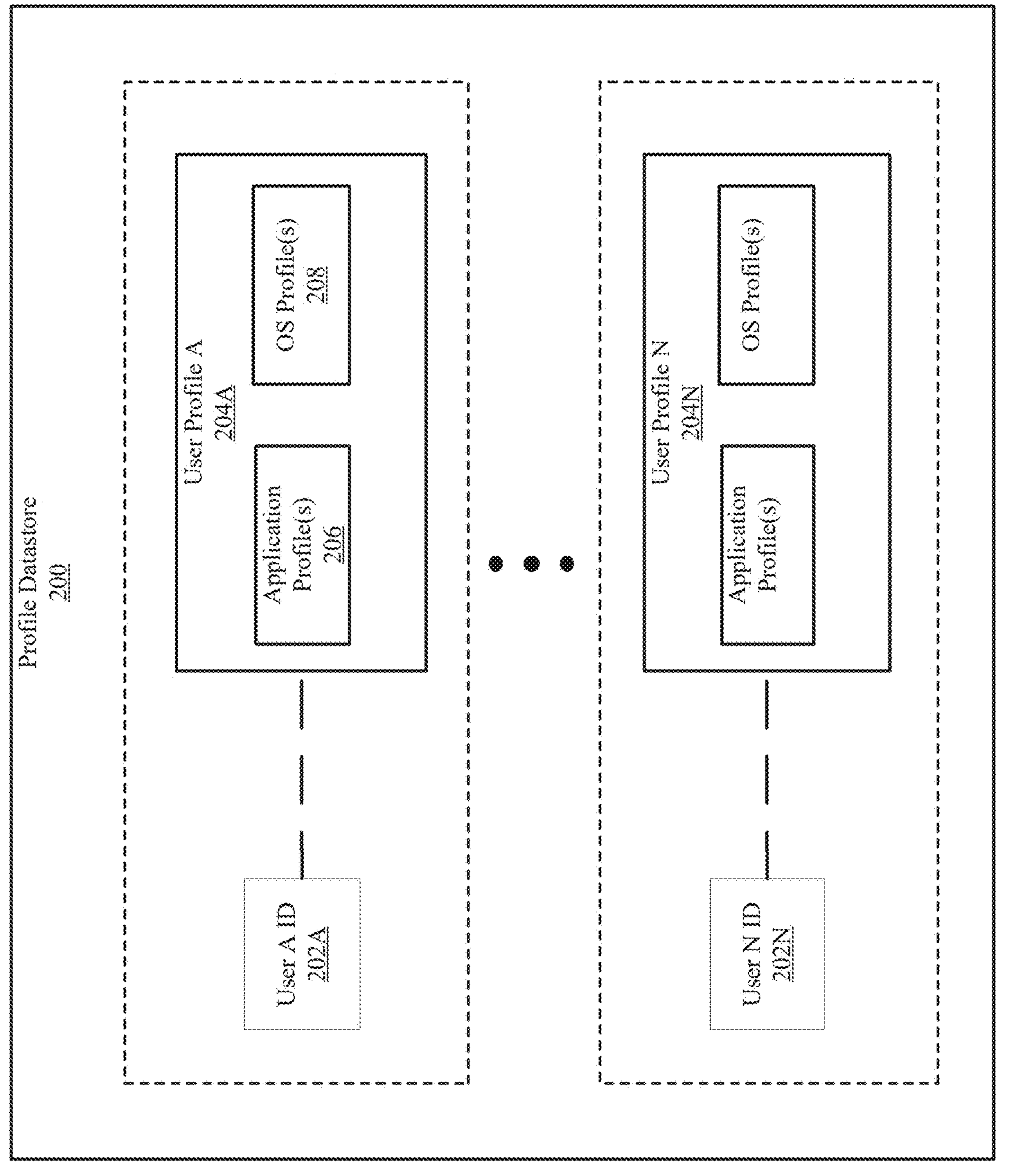
FIG. 2.1

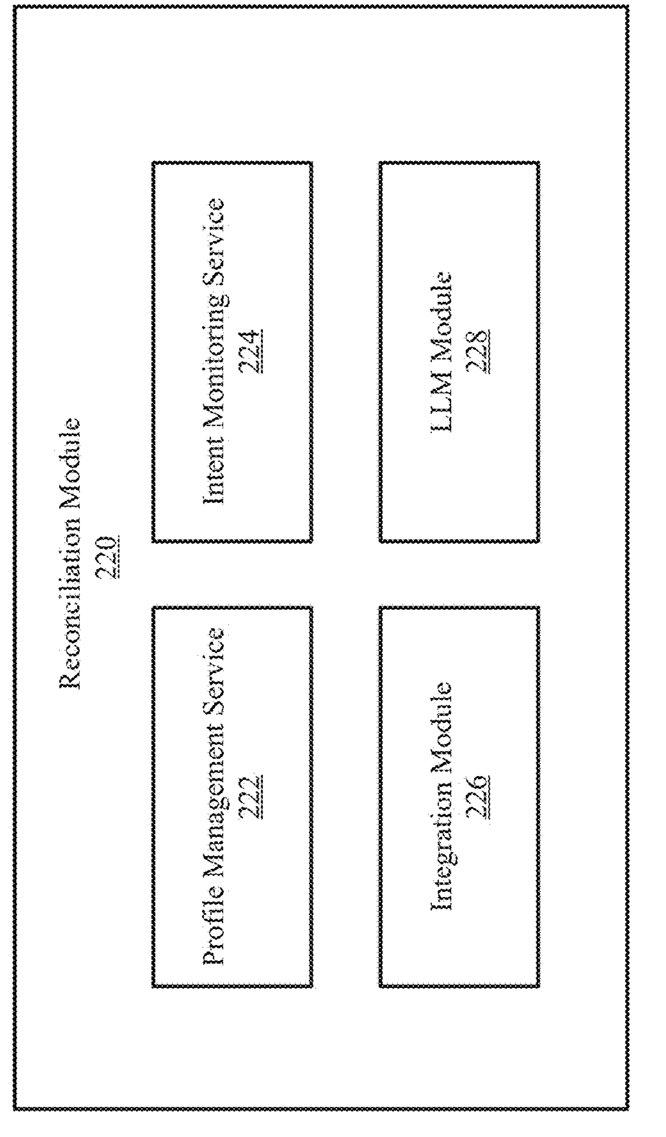
FIG. 2.2
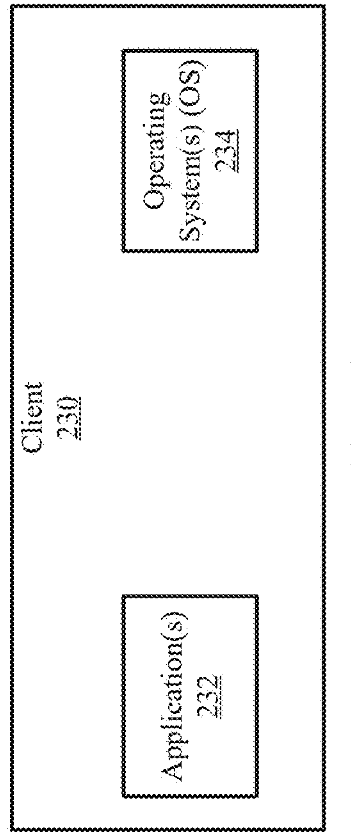
FIG. 2.3

METHOD FOR CONFIGURING DEVICE SETTINGS BASED ON USER INTENT

BACKGROUND

Users often use multiple devices and users also tend to have preferences on how their devices should be configured. However, traditional approaches to configuring devices rely on manual configuration, which is time consuming.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIG. 2.1 shows a diagram of a profile datastore in accordance with one or more embodiments disclosed herein.

FIG. 2.2 shows a reconciliation module in accordance with one or more embodiments disclosed herein.

FIG. 2.3 shows a client in accordance with one or more embodiments disclosed herein.

DETAILED DESCRIPTION

Figure 1:
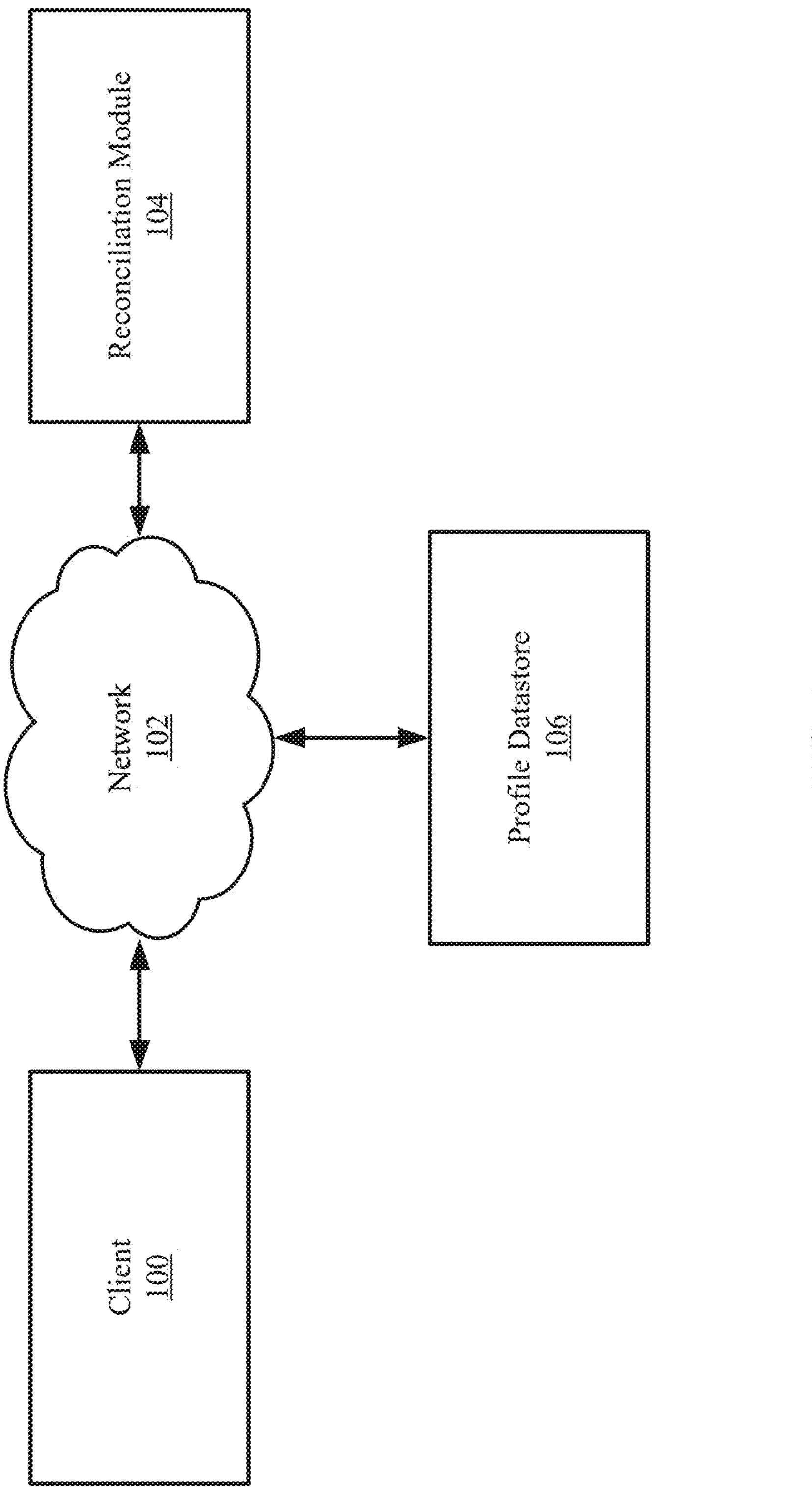
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively clients). Thus, any path through which information may travel may be considered an operative connection.

Users often use multiple devices throughout their normal business operations. Users often switch between multiple devices when completing tasks for the business operations. They also often register new devices in their normal course of business. In each case, they lose time adjusting themselves to a new or different device and frequently require changing settings within the electronic device to match user preferences across the multiple electronic devices.

In certain scenarios, a user may want to match user preferences from one application or device to another application or another device. As a non-limiting example, consider a scenario in which a user prefers to use a system-level dark mode feature. When registering a new electronic device, the user would want to enable the system-level dark mode to keep consistent behavior across their devices. In such a situation, the user will need to change the settings for every registered electronic device or application which, when expanded to multiple preferences, can become time consuming and costly. The traditional approaches rely on manual setting manipulation per device or enabling a system-wide feature that requires individual application manipulation on a per device basis to configure the preferred settings. Both approaches require continuous manual configuring.

The limitations of the traditional approaches to configuring new electronic devices restrict the scalability and efficiency of registering electronic devices to users. For at least the reasons discussed above, a different approach is needed to address these challenges and improve the efficiency for configuring devices. Embodiments of the invention relate to a method for configuring electronic devices based on identified user preferences. As a result of the processes discussed below, one or more embodiments disclosed herein advantageously ensure that configuration of registered electronic devices will reflect user preferences and ensure a consistent experience across a range of electronic devices.

The following describes one or more embodiments.

FIG. 1 shows a system in accordance with one or more embodiments. The system may include any number of clients (100), a reconciliation module (104), and a profile datastore (106). The system may include additional, fewer, and/or different components without departing from the scope described herein. Each component may be operably/operatively connected to any of the other components via any combination of wired and/or wireless connections. Each of these system components is described below.

In one or more embodiments, the client (100), the reconciliation module (104), and the profile datastore (106) may be operatively connected one another through a network (102) (e.g., a local area network (LAN), a wide area network (WAN) such as the Internet, a mobile network, any other network type, or any other connection type not listed). Further, the network (102) may encompass various interconnected, network-enabled subcomponents (or systems) (e.g., switches, routers, gateways, etc.) that may facilitate communications between the client (100), the reconciliation module (104), and the profile datastore (106). Moreover, the client (100), the reconciliation module (104), and the profile datastore (106) may communicate with one another using any combination of wired and/or wireless communication protocols. The client (100), the reconciliation module (104), and the profile datastore (106) may be located on a single physical and/or logical computing system.

In one or more embodiments, the client (100) is an electronic device (e.g., a computer, a server, a cellphone, a pager, etc.). The client (100) may permit users to interact with elements within the electronic device such as an application or an operating system. In one or more embodiments, the client (100) may communicate with, for example, the reconciliation module (104) and/or the profile datastore (106). Further, the client (100) includes functionality to perform at least a portion of the methods shown in FIGS. 3-6. One of ordinary skill will appreciate that the client (100) may perform other functionalities without departing from the scope of the invention.

As used herein, interact means to use or engage with an electronic device, application and/or operating system using any known or later discover mechanism for interacting with electronic devices.

In one or more embodiments disclosed herein, the client (100) may be a physical device or a virtual device such as a personal computing system (e.g., a laptop, a cell phone, a tablet computer, etc.) of a user. For example, the client (100) may be a computing system (e.g., 700, FIG. 7) as discussed below in more detail in FIG. 7.

Additional details regarding one or more embodiments of the client (100) are described in FIG. 2.3.

In one or more embodiments, the reconciliation module (104) includes the functionality to monitor user preferences across clients and configure the clients to match the monitored user preferences. Additionally, the reconciliation module (104) also includes functionality to send configuring instructions, as a set of tasks, to the client (100) to configure clients. In one or more embodiments, the reconciliation module (104) uses stored profile information in the profile datastore (106) to identify which settings to change. In one or more embodiments, the reconciliation module (104) utilizes a large language module (LLM) to generate a set of questions to ask a user to better understand the user preferences. In doing so, the reconciliation module (104) can provide more personalized suggestions and, using the LLM, can generate a set of tasks to configure the clients. Further, the reconciliation module (104) includes functionality to perform at least a portion of the methods shown in FIG. 3-6. One of ordinary skill will appreciate that the labeling system may perform other functionalities without departing from the scope herein.

In one or more embodiments disclosed herein, the reconciliation module (104) may be a physical device or a virtual device such as a personal computing system (e.g., a laptop, a cell phone, a tablet computer, etc.) of a user. For example, the reconciliation module (104) may be a computing system (e.g., 700, FIG. 7) as discussed below in more detail in FIG. 7. Additional detail regarding one or more embodiments of the reconciliation module is described in FIG. 2.2.

In one or more embodiments, the profile datastore (106) includes functionality to store user profile data including application and operating system (OS) data. Each of the data items may comprise multiple modalities of data without departing from the invention. The profile datastore (106) may be volatile storage, non-volatile storage, or any combination thereof. Examples of a storage include (but are not limited to): a hard disk drive (HDD), a solid-state drive (SSD), random access memory (RAM), Flash memory, a tape drive, a fibre-channel (FC) based storage device, a floppy disk, a diskette, a compact disk (CD), a digital versatile disc (DVD) a non-volatile memory express (NVMe) device, a NVMe over Fabrics (NVMe-oF), resistive RAM (ReRAM), persistent memory (PMEM), virtualized storage, and virtualized memory. In one or more embodiments, the profile datastore (106) may include functionality to store user data associated with multiple clients, operating systems, and/or applications. The profile datastore (106) may partition the user profile data based on the medium. As a non-limiting example, the profile data store (106) may store application user profile data in an application section. The profile datastore (106) may include multiple partitions associated with one user without departing from the scope of the disclosure herein. Additional details regarding one or more embodiments of the profile datastore (106) is described in FIG. 2.1.

Turning to FIG. 2.1, FIG. 2.1 shows a profile datastore (200) in accordance with one or more embodiments. The profile datastore (200) includes one or more user profiles (e.g., user profile A (204A), user profile N (204N), etc.) where each of the user profiles is associated with a user (e.g., user A ID (202A), user N ID (202N), etc.). Each user profile contains at least one sub profile consisting of an application profile (206) and an OS profile (208). Each of these components is described below.

The user profile (e.g., 204A, 204N) contains natural language translations of user preferences and settings associated with a client. In one or more embodiments, the natural language translations are stored within an application profile (206) or an OS profile (208), as appropriate. One of ordinary skill will appreciate that the profile datastore (200) may contain additional data without departing from the scope of the disclosure.

In one or more embodiments, the application profile (206) includes the functionality to store natural language translations of user preferences relating to an application. As a non-limiting example, such user preferences could include changing a mode of a word processing application to light mode even though the system default is set to dark mode. In one or more embodiments, the application profile (206) may be subdivided into multiple application profiles, where each application profile is associated with a unique application. In one or more embodiments, the user profile (204) may contain additional sub profiles associated with configuration information without departing from the scope disclosed herein. In one or more embodiments, other file organization methods may be used without departing from the scope disclosed herein.

In one or more embodiments, the OS profile (208) includes the functionality to store natural language translations of user preferences relating to an OS. As a non-limiting example, such user preferences could include setting the system-wide viewing mode to dark mode or configuring trackpad scrolling behavior. In one or more embodiments, the OS profile (208) may be subdivided into multiple OS profiles, where each OS profile is associated with a unique OS. In one or more embodiments, other file organization methods may be used without departing from the scope disclosed herein, Turning to FIG. 2.2, FIG. 2.2 shows a reconciliation module (220) in accordance with one or more embodiments herein. In one or more embodiments, the reconciliation module contains a profile management service (222), an intent monitoring service (224), an integration module (226), and an LLM module (228). Each of these components is described below.

In one or more embodiments, the profile management service (222) includes functionality to determine and manage profile privileges in the profile datastore (106) by receiving user preferences translated by the LLM module (228) and identified by the intent monitoring service (224). In one or more embodiments, the profile management service (222) may dynamically adjust user profile access privileges based on real-time behavior logged by the intent monitoring service (224). As a non-limiting example, the profile management service may receive information indicating that a user only uses a portion of an application that requires lower privileges. The profile management service (222) may limit the profile datastore (106) to only store user preferences for just the portion commonly accessed. One of ordinary skill will appreciate that the profile management service (222) may perform other functionalities without departing from the scope of the disclosure.

In one or more embodiments, the intent monitoring service (224) includes functionality to continuously monitor user preferences associated with a client and update the profile management service (222) in real-time. In one or more embodiments, the intent monitoring service (224) analyzes behavior within the overlap between the functionality of a client and the user preferences, the circle of influence (COI). As used herein, the COI is the overlap between the user preferences associated with a different clients. The client information (also referred to as electronic device information) may include the client/application settings, functionalities, capabilities, and any other information that could be useful in configuring the device with the user preferences associated with the client. As a non-limiting example, the intent monitoring service (224) may monitor user preferences associated with a first client (e.g., dark mode settings, language preferences, scrolling preferences, etc.). In this example, when a second client is connected, the intent monitoring service compares the monitored user preferences to the second client's capabilities to determine that dark mode settings and language preferences can apply but scrolling preferences cannot. Said another way, the second client does not have the functionality to include scrolling preferences. Accordingly, the intent monitoring service (224) determines the COI to the monitored user preferences minus the scrolling preferences recorded in the user profile. The intent monitoring service (224) may monitor a client in any way without departing from the scope herein.

In one or more embodiments, the integration module (226) includes functionality to receive tasks generated by the LLM module (228) and sends them to the client to execute. The task may include altering scrolling preferences, changing notification settings, or configuring file access without departing from the method.

In one or more embodiments, the LLM module (228) includes functionality to translate user preferences into natural language descriptions by receiving real-time user preferences from the intent monitoring service (224). In one or more embodiments, the LLM module (228) generates tasks to configure a client by identifying the circle of interest (COI) between the user profile (204) and the client. In one or more embodiments, the LLM module (228) may generate a set of questions to ask the user based on information received from the profile management service (222). The set of questions may be designed to evaluate access privileges for clients, to ensure the user is accurately answering questions by including certain trick questions, to confirm user preferences, to verify that user preferences from one client should be configured in another client, and any other question that may help evaluate user behavior to better configure the client. In one or more embodiments, the LLM module may validate its outputs as described below in FIG. 5. One of ordinary skill will appreciate that the LLM module (228) may perform other functionalities without departing from the scope of the disclosure.

Turning to FIG. 2.3, FIG. 2.3 shows a client (230) in accordance with one or more embodiments. The client (230) includes one or more applications (232), and an OS (234). Each of these components is described below.

In one or more embodiments, the application (232) is a computer program associated with a device. As a non-limiting example, the application (232) may be a word processing application. The application (232) may have certain settings which the user may configure to reflect the user preferences.

In one or more embodiments, the OS (234) is an operating system that hosts the application. The OS (234) may have certain settings which the user can configure to reflect the user preferences.

Figure 3:
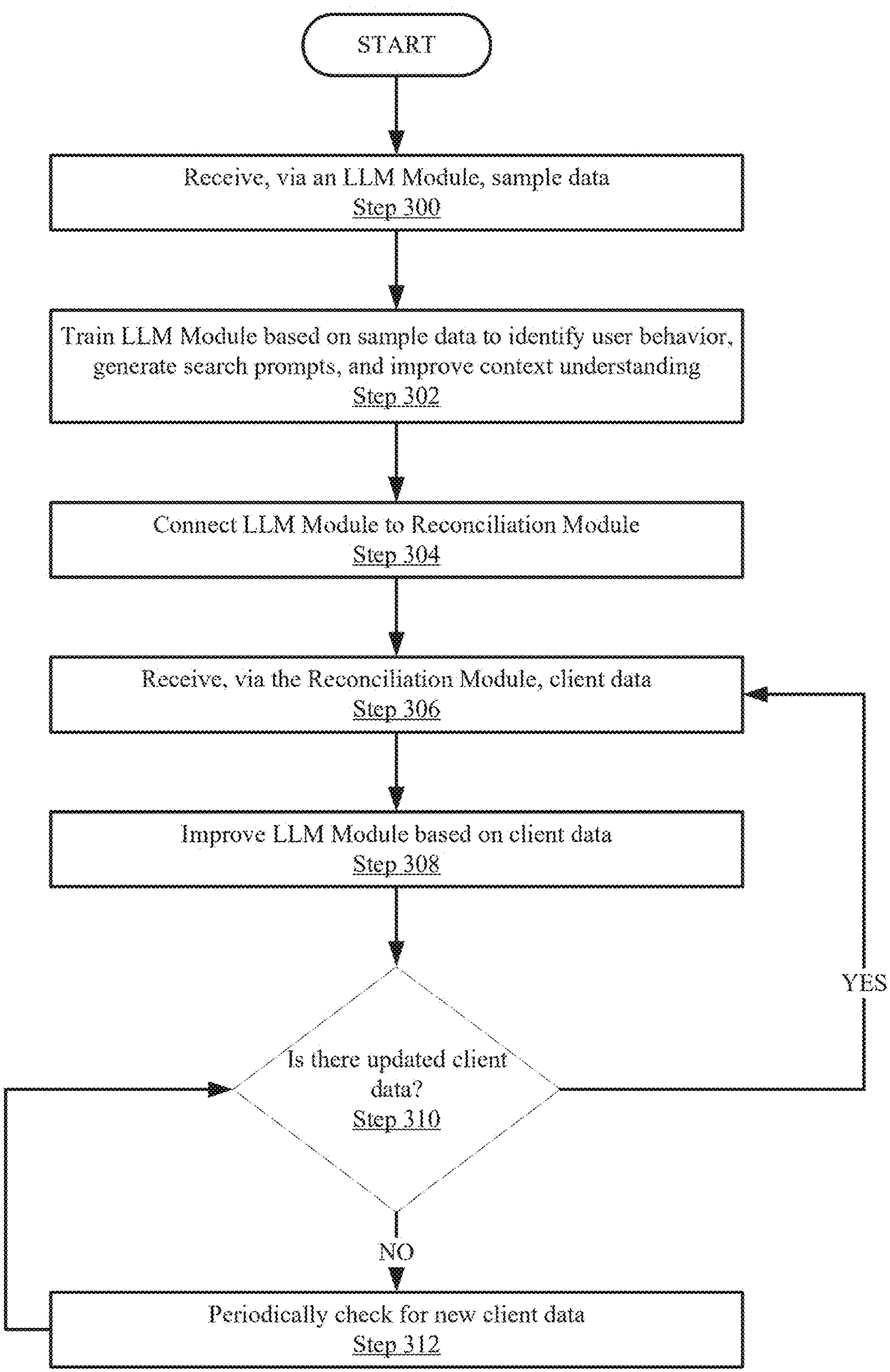
FIG. 3 shows a flowchart of a method for training a large language model (LLM) in accordance with one or more embodiments disclosed herein.

Turning to FIG. 3, FIG. 3 shows a flowchart of a method for training a large language model (LLM) in accordance with one or more embodiments disclosed herein. The method may be performed by, for example, the LLM module (228, FIG. 2.2). Other components in the system may perform this method without departing from the invention.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 3 may be performed concurrently with one or more steps in FIGS. 4-6.

In step 300, the LLM module (228, FIG. 2.2) receives sample data. In one or more embodiments, the sample data could be existing profile datastores, examples of user preferences, emulated behavior, or any other type of data that could train the LLM Module (228) to configure a device. In one or more examples, the sample data may be a combination of internal and external data. As used herein, external data means data, including proprietary data, that is sourced from open source locations, proprietary organizations, and/or any source not owned or operated by the client.

In step 302, the LLM module (228) is trained based on the sample data to identify user behavior, generate search prompts, translate user preferences to natural language, and improve context understanding. In one or more embodiments, the training initializes the LLM module (228) before it connects to the reconciliation module (220).

In step 304, the LLM module (228) is operatively connected to the reconciliation module (220). This allows the LLM module (228) to connect with the profile management service (222), the intent monitoring service (224), and the integration module (226).

In step 306, the LLM module (228) receives client data from the profile datastore (104). The client data may be associated with multiple clients (i.e., associated with different electronic devices). In one or more embodiments, the client data may be associated with the user profile in the profile datastore and may be organized according to entity type (e.g., application profile, OS profile, etc.).

In step 308, the LLM module (228) improves its functionality using the client data. In one or more embodiments, improving involves reading the client data, comparing the client data to the sample data that trained the LLM module (228), and updating the LLM module (228) capabilities to more effectively handle the client data. In one or more embodiments, the LLM module may flag certain outputs for manual review to improve functionality. The manual review is discussed further in FIG. 6 below.

In step 310, the LLM module (228) makes a determination as to whether there is any updated client data by communicating with the intent monitoring service (224). Accordingly, in one or more embodiments, if the determination is YES, the LLM module goes back to step 306. If the determination is NO, the method continues to step 312.

In step 312, the LLM module (228) periodically checks for new client data by routinely connecting with the intent monitoring service (224).

Figure 4:
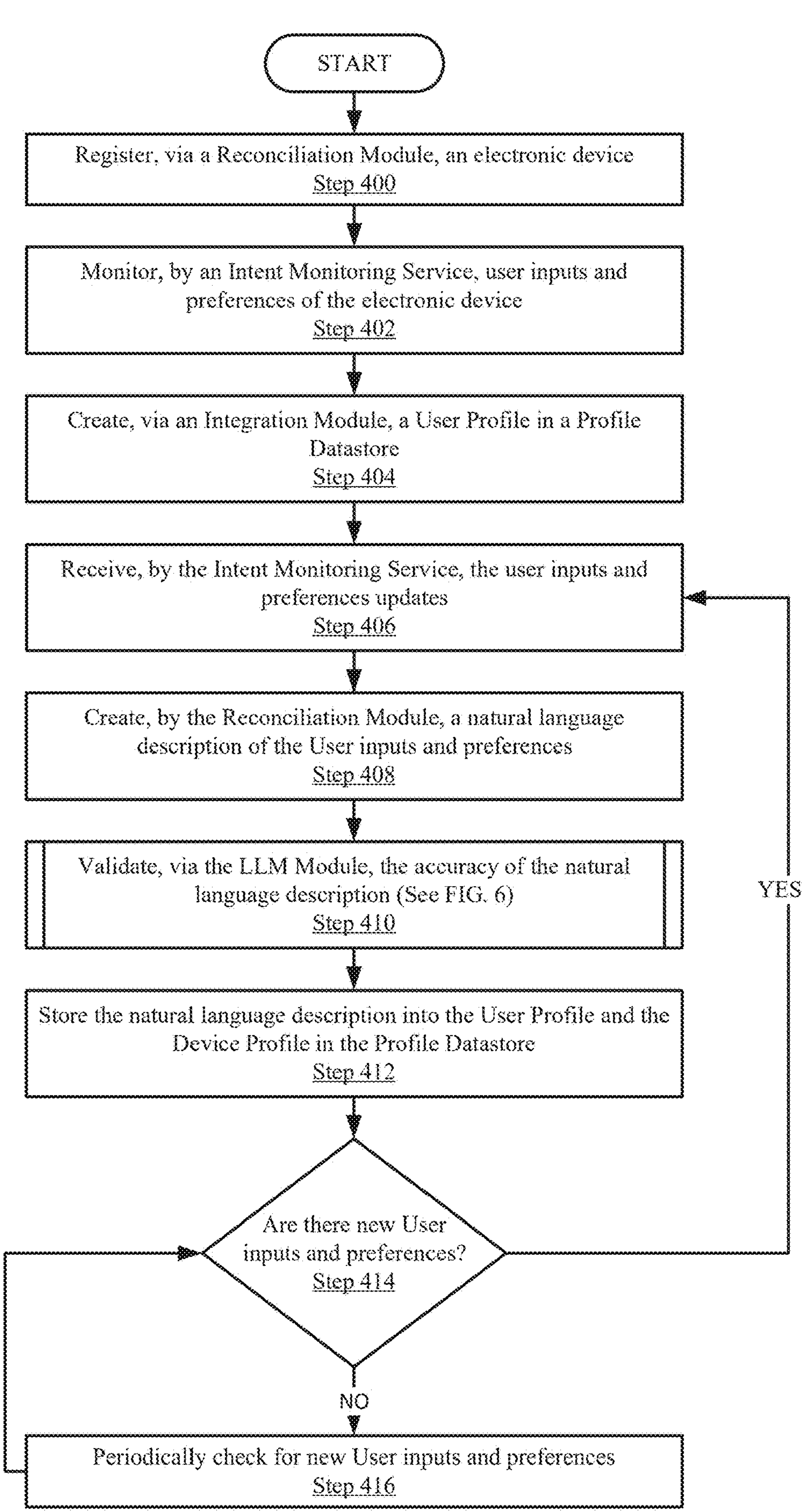
FIG. 4 shows a flowchart of a method for populating the profile datastore in accordance with one or more embodiments disclosed herein.

Turning to FIG. 4, FIG. 4 shows a flowchart of a method for populating the profile datastore in accordance with one or more embodiments disclosed herein. The method may be performed by, for example, the reconciliation module (220). Other components in the system may perform this method without departing from the invention.

While the various steps in the flowchart shown in FIG. 4 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 4 may be performed concurrently with one or more steps in FIGS. 3 and 5-6.

In step 400, the reconciliation module (220) registers a new client (also referred to as an electronic device). In one or more embodiments, the new electronic device may be a physical device or a virtual device such as a personal computing system (e.g., a laptop, a cell phone, a tablet computer, etc.). As a non-limiting example, a user may log in to a new work laptop that is then registered by the reconciliation module (220). In this example, the new electronic device may be an initial electronic device associated with the user.

In step 402, the intent monitoring service (224) monitors the user inputs and behaviors on the new electronic device to gather a user preference. A non-limiting example would be a user's scrolling preference when using the new electronic device. In one or more embodiments, any user input and behavior may be monitored without departing from the scope disclosed herein. The user preference may be listed in the form of raw data, text strings, or any other appropriate data recording method without leaving the scope herein. The intent monitoring service (224) may continuously monitor new inputs and behaviors associated with the new electronic device.

In step 404, a user profile (204) is created within the profile datastore (106).

In step 406, the LLM module (228) receives the user preferences from the intent monitoring service (224). In one or more embodiments, the LLM module (228) is trained to accept to data format in which the user preferences are sent.

In step 408, the LLM module (228) creates a natural language description of the user preferences. In one or more embodiments, the natural language description is a human language translation of the data containing the user preferences. As a non-limiting example, a user's scrolling preference may be recording as a string of characters by the intent monitoring service (224) and translated to "two finger scroll to move the page down" by the LLM module (228).

In step 410, the natural language description is validated by the LLM module (228) via an artificial intelligence (AI) hallucination threshold. In one or more embodiments, the AI hallucination threshold is set by one of ordinary skill in the art. As used herein, an AI hallucination is an incorrect or misleading LLM generation. The validation is further discussed further in FIG. 6. One of ordinary skill will appreciate that the LLM module (228) may validate the natural language description using other methods without departing from the scope of the disclosure.

In step 412, the natural language description is stored in the user profile (204) within the profile datastore (106). In one or more embodiments, the LLM module (228) sends the natural language description to the integration module (226) which then receives instructions from the profile management service (222) to store the natural language description. In one or more embodiments, the natural language description may be stored in the application profile (206) or the OS profile (208) depending on its characteristics. As a non-limiting example, if the natural language description describes an application preference, it would be stored in the application profile (206).

In step 414, the LLM module (228) makes a determination as to whether there are any new user preferences. Accordingly, in one or more embodiments, if the determination is YES, the LLM module (228) goes back to step 406. If the determination is NO, the method continues to step 416.

In step 416, the reconciliation module (220) periodically checks for new updates to user preferences in the target entities to make the determination in step 414.

Figure 5:
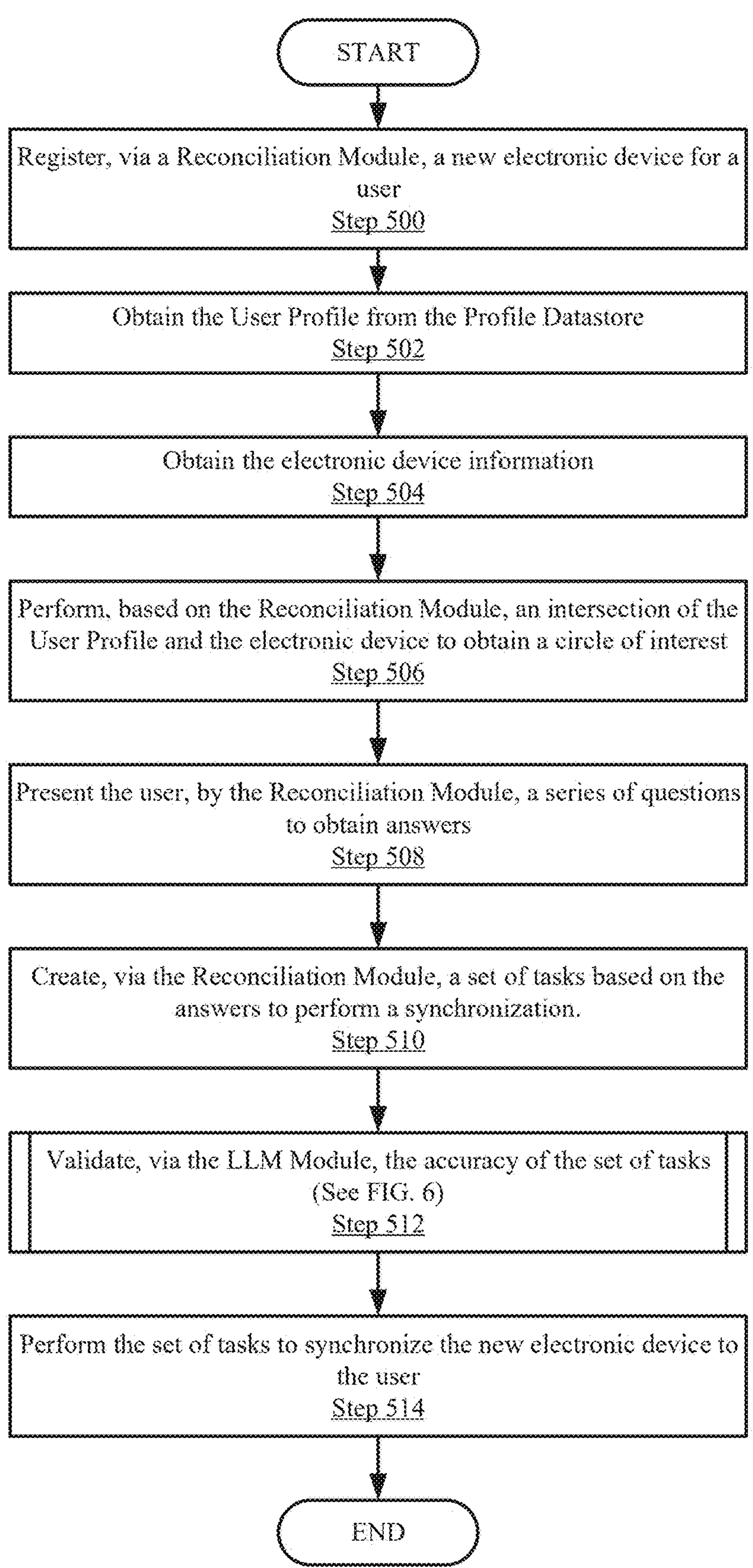
FIG. 5 shows a flowchart of a method for configuring electronic devices in accordance with one or more embodiments disclosed herein.

Turning to FIG. 5, FIG. 5 shows a flowchart of a method for configuring electronic devices in accordance with one or more embodiments herein. The method may be performed by, for example, the reconciliation module (104). Other components in the system may perform this method without departing from the invention.

While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 5 may be performed concurrently with one or more steps in FIGS. 3-4 and 6.

In step 500, an electronic device (also referred to as a client) is registered via the reconciliation module (220). In one or more embodiments, the electronic device is registered after a second electronic device is used to initialize the reconciliation module (220). As a non-limiting example, the second electronic device may be a computer to onboard a user while the electronic device may be a cellphone registered after the computer onboarding is completed. Continuing the example, the user profile in the profile datastore may be based on the second electronic device and the method described below is used to configured the electronic device based on the preferences initialized according to the second electronic device.

In step 502, the user profile (204) created during the second device initialization, in step 404, is obtained from the profile datastore (106). In one or more embodiments, the reconciliation module (220) obtains the user profile from the profile datastore (106) by connecting with the profile management service (222).

In step 504, electronic device information is obtained by the reconciliation module (220) via the intent monitoring service (224). In one or more embodiments, the electronic device information may be configurable data inherent to the electronic device. As a non-limiting example, electronic device information may include brightness settings, initial file sorting, default file path locations, start-up application permissions, etc. One of ordinary skill will appreciate that the electronic device information may include configurable settings unique to the electronic device as well as configurable settings inherent to multiple devices, such as volume controls, without departing from the scope of the disclosure.

In step 506, a circle of interest (COI) is obtained by the reconciliation module (220) using the intent monitoring service (224). In one or more embodiments, a COI is obtained by intersecting the user profile (206) and the electronic device information. In one or more embodiments, the COI is the overlap between the electronic device information (which may be translated into a natural language format in order to determine the intersection) and the natural language description stored in the user profile (206). As a non-limiting example, the COI may be a theme preference identified by comparing the theme natural language description in the user profile (206) and the theme configuration options in the electronic device information. The theme preference is included in the COI due to a determination that the electronic device can be configured to match the natural language description in the user profile (206).

In step 508, the reconciliation module (220) presents a series of questions to the user to obtain answers. In one or more embodiments, the series of questions may target user preferences to confirm prior preferences in the profile datastore. As a non-limiting example, the series of questions may include a question asking if the electronic device should be set to dark mode. The question may be based off of information in the profile datastore indicating that a prior electronic device was set to dark mode. In one or more embodiments, the series of questions may include one or more trick questions to confirm that the user is accurately answering the questions. As used herein, trick question means a purposefully misleading or incorrect question designed to ensure that the user is actually reading the questions as opposed to just clicking the same answer, e.g., yes or no, in response to each question. Continuing the dark mode example above, the trick question may be presented as asking if dark mode should be turned off even when it is already off. If the user answers yes, the reconciliation module (220) can confirm that the user is likely not reading before answering questions and may repeat the questions to obtain accurate responses. In one or more embodiments, the reconciliation module (220) may repeat questions intermixed with trick questions until the user can answer all (or substantially all) the questions without incorrectly answering any (or less than a threshold number of) trick questions.

In step 510, the reconciliation module (220) creates a set of tasks, using the LLM module (228), based on the answers to configure the electronic device. In one or more embodiments, the set of tasks may include instructions to configure the application, and/or the operating system. The set of tasks may include instructions for any component or entity that can be part of the configuration process without departing from the scope of the disclosure herein.

Figure 6:
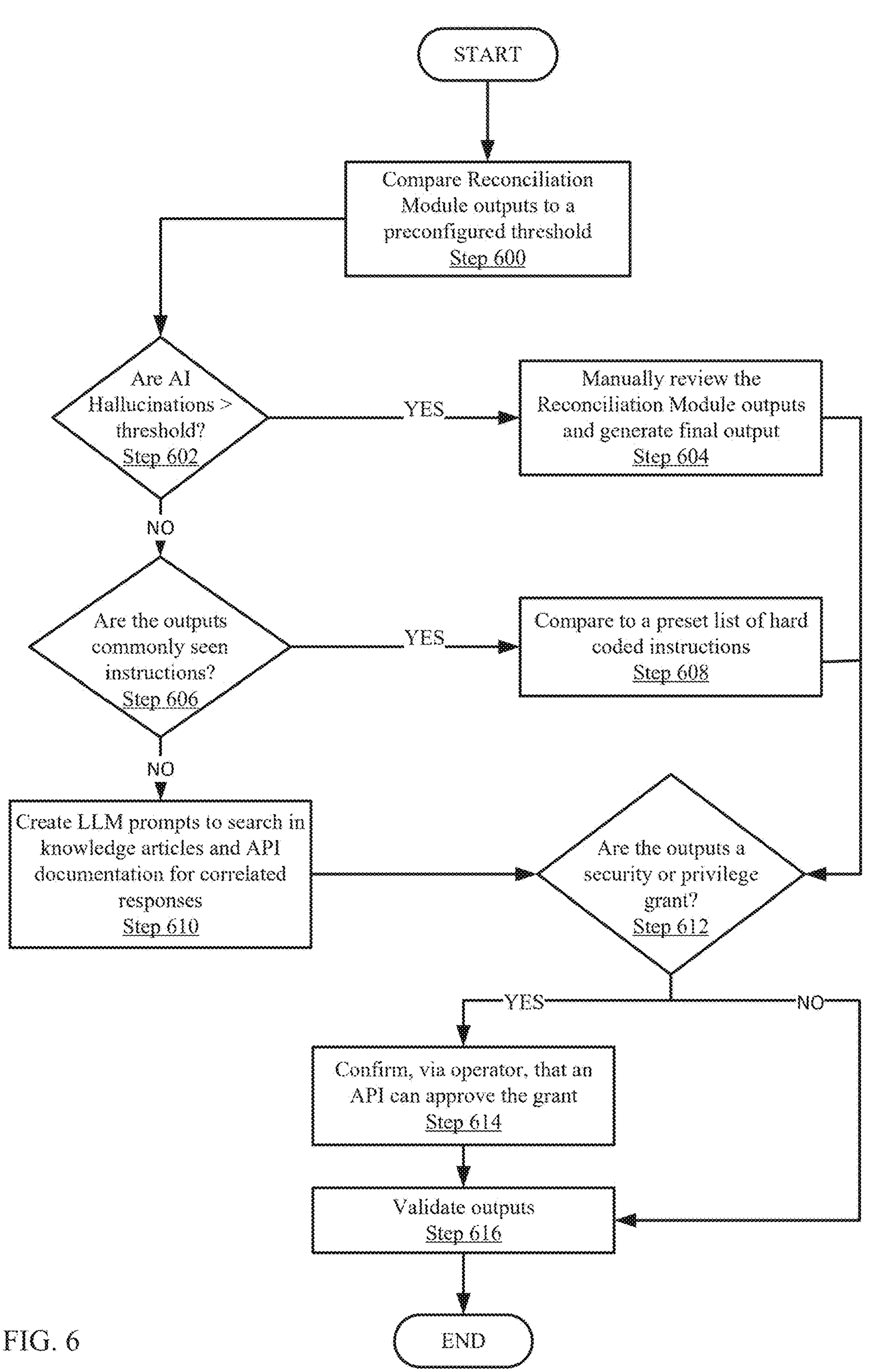
FIG. 6 shows a flowchart of a method for validating LLM outputs in accordance with one or more embodiments disclosed herein.

In step 512, the LLM module (228) validates the accuracy of the set of tasks via the method described in FIG. 6. In step 514, once the LLM module (228) outputs are validated, the reconciliation module pushes the set of tasks to the electronic device, where upon receipt, the tasks are executed to implement the configuration. In one or more embodiments the method may end.

Turning to FIG. 6, FIG. 6 shows a flowchart of a method for validating LLM module (228) outputs via the LLM module (228) as described in step 410 and 512 respectively. The method may be performed by, for example, the LLM module (228). Other components in the system may perform this method without departing from the invention.

While the various steps in the flowchart shown in FIG. 6 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel. Further, one or more steps in FIG. 6 may be performed concurrently with one or more steps in FIGS. 3-5.

In step 600, the LLM module (228) compares the LLM module (228) outputs to a preconfigured threshold. The outputs may be any output generated by the LLM model, e.g., natural language descriptions (see e.g., FIG. 4) and one or more tasks (see e.g., FIG. 5)).

Continuing with the discussion of step 600, in one or more embodiments, the threshold may be set by a third-party service, or an engineer well versed in the art. Any method of establishing the threshold may be used without departing from the scope of the disclosure herein. As a non-limiting example, the threshold may be established using any known or later discovered LLM output checker. Any comparison method may be used, either proprietary, open-source, or internally developed, without departing from the scope disclosed herein.

In step 602, the LLM module makes a determination as to whether the LLM module outputs include AI hallucinations greater than the threshold. As used herein, the AI hallucinations are outputs that may cause incorrect or misleading outputs. In one or more embodiments, the threshold determines the percentage of acceptable AI hallucinations in the LLM model outputs. In one or more embodiments, if the result of the determination is YES, the method proceeds to step 604. If the result of the determination is NO, the method may proceed to step 606.

In step 604, based on a positive determination in step 602, the LLM module flags the LLM module outputs for manual review. In one or more embodiments, new outputs are manually generated based on the manual review. In one or more embodiments, an Information Technology (IT) team may review and generate new outputs for the system based on the flagging. After manually generating the outputs, the method may proceed to step 612.

In step 606, based on a negative determination in step 602, the LLM module determines that the LLM module outputs are within the threshold and makes a second determination as to whether the LLM module outputs are commonly seen instructions. As used herein, commonly seen instructions are configuration instructions repeatedly generated by the system or listed in an online database of configuration instructions (not shown). As a non-limiting example, a common instruction in the commonly seen instructions may include dark mode instructions. The dark mode instructions may be instructions consistently generated by the system. In one or more embodiments, the IT team may determine which instructions constitute commonly seen instructions. Any method to classify commonly seen instructions may be used without departing from the scope of the disclosure herein. Accordingly, in one or more embodiments, if the result of the second determination is YES, the method proceeds to step 608. If the result of the second determination is NO, the method may proceed to step 610.

In step 608, after determining that the LLM module output is a commonly seen instruction, the LLM module compares the LLM module output to a preset list of hardcoded instructions. In one or more embodiments, the preset list of hardcoded instructions may be preset by the IT team and may include instructions previously generated from the system or from external sources associated with configuring electronic devices.

In step 610, after determining that the LLM module output is not a commonly seen instruction (e.g., a natural language description) the LLM module creates LLM prompts to search in the knowledge articles and API documentation for correlated responses. In one or more embodiments, the LLM prompts may include language to compare the LLM module output to existing knowledge to verify if the output is accurate and useable. As a non-limiting example, the LLM module output may be an instruction to set a customized keybind unique to the user. As used herein, the keybind refers to a combination of keys that correlate to a different action such writing the letters WR automatically autocorrect to "writing response". Continuing the above example, the LLM module may create an LLM prompt to search for similar outputs to the customized keybind instruction that can validate the output. Yet another example may include an LLM module output that translates user inputs into a natural language description. As the natural language description is not an instruction, the LLM module may create the LLM prompt to validate the LLM module output.

In step 612, the LLM module makes another determination as to whether the LLM module outputs require a security privilege or grant. As used herein, the phrase security privilege or grant means requiring heightened computer access. As a non-limiting example, the security privilege or grant may involve executing a task to change the read or write access within a file system executing on an electronic device. If the result of the determination is YES, the method proceeds to step 614 and an operator (e.g., the IT team) confirms that an API can approve the grant. If the result of the determination is NO, the method proceeds to step 616 and the LLM module validates the LLM module outputs. In one or more embodiments, the method ends here.

Figure 7:
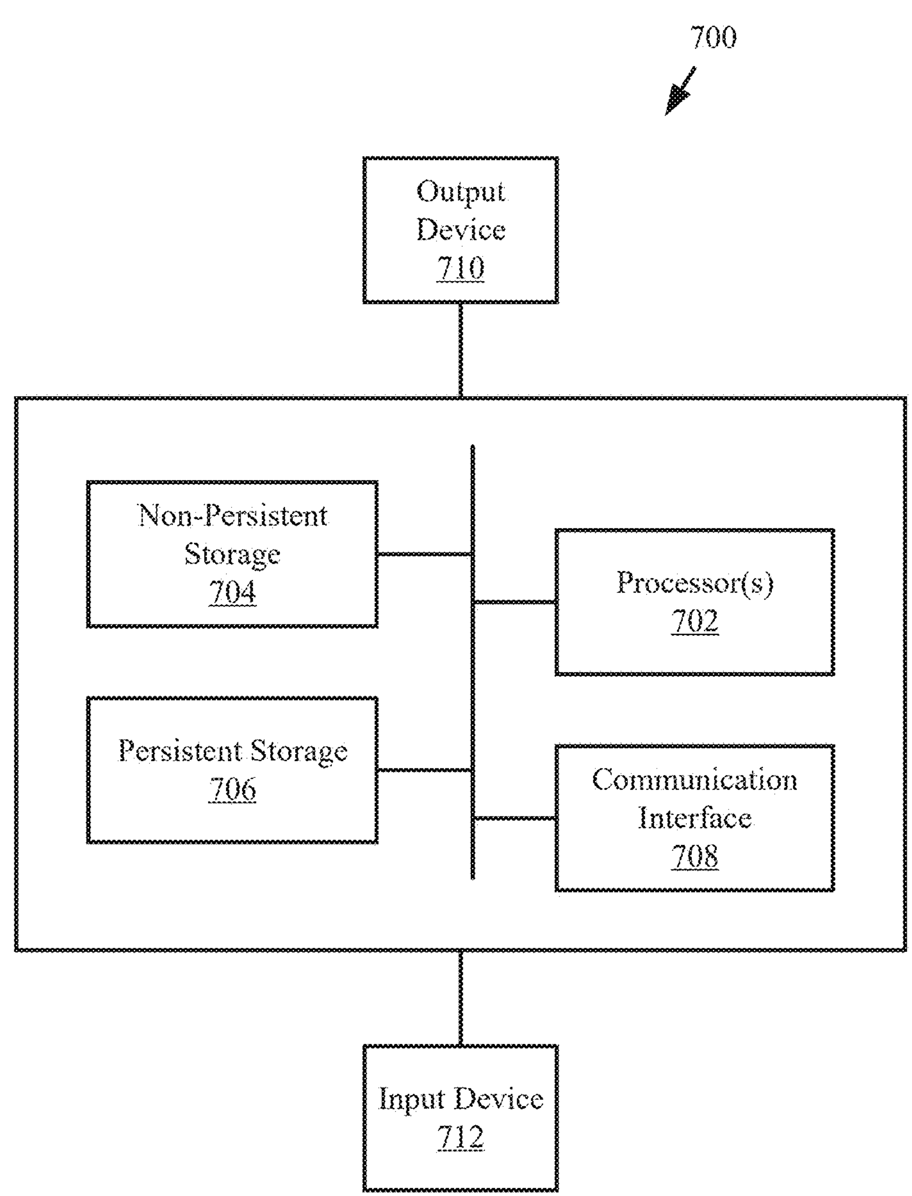
FIG. 7 shows a computing system in accordance with one or more embodiments disclosed herein.

Embodiments of the disclosure may be implemented using computing devices. FIG. 7 shows a diagram of a computing device (700) in accordance with one or more embodiments. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (708) (e.g., Bluetooth interface, infrared interface, network interface, optical interface, etc.), input devices (710), output devices (708), and numerous other elements (not shown) and functionalities. Each of these components is described below.

In one embodiment, the computer processor(s) (702) may be an integrated circuit for processing instructions. For example, the computer processor(s) (702) may be one or more cores or micro-cores of a processor. The computing device (700) may also include one or more input devices (710), such as a touchscreen, keyboard, mouse, microphone, touchpad, electronic pen, or any other type of input device. The communication interface (708) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (708, 710) may be locally or remotely connected to the computer processor(s) (702), non-persistent storage (704), and persistent storage (706). Many diverse types of computing devices exist, and the aforementioned input and output device(s) (710, 708) may take other forms.

What is claimed is:

1. A method for configuring electronic devices, the method comprising:

obtaining a user profile for a user;

obtaining electronic device information for an electronic device associated with the user;

determining a circle of interest (COI) using the user profile and the electronic device information;

presenting, based on the COI, a set of questions to the user;

receiving, in response to the presenting, a set of answers from the user;

generating, based on the set of answers, a plurality of tasks;

validating the plurality of tasks using a large language model (LLM); and based on the validating, initiating execution of the plurality of tasks on the electronic device, wherein the electronic device is configured after the plurality of tasks are executed.

2. The method of claim 1, wherein the user profile comprises an application profile and an operating system profile, wherein the application profile specifies user-application interaction preferences for at least one application executing on a second electronic device used by the user, and wherein operating system profile specifies user-device interaction preferences for the second electronic device used by the user.

3. The method of claim 2, wherein the user-application interaction preferences specify a notification setting in the at least one application.

4. The method of claim 2, wherein the user-device interaction preferences specify a scrolling preference on the second electronic device.

5. The method of claim 1, further comprising:

prior to obtaining the user profile:

monitoring user inputs and preferences of the user on the second electronic device;

creating a natural language description of the user inputs and preferences; and storing the natural language description in the user profile associated with the user.

6. The method of claim 5, further comprising:

prior to storing the natural language description:

validating the natural language description of the user inputs and preferences using the large language model (LLM), wherein the validating determines whether the natural language description of the user inputs and preferences comprises any hallucinations, and wherein once the natural language description of the user inputs and preferences are validated, they are stored in the user profile.

7. The method of claim 1, wherein the set of questions is generated by the large language model.

8. The method of claim 7, wherein at least one question in the set of questions is a trick question to confirm that the user is not inputting improper data.

9. The method of claim 1, wherein the set of answers is validated by the large language model.

10. The method of claim 1, wherein executing the plurality of tasks comprises:

determining that a task of the plurality of tasks requires additional approval prior to execution on the electronic device;

in response to the determination, issuing an authorization request to an approving entity, receiving, in response to the authorization request, an authorization to initiate execution of the task.

11. The method of claim 1, wherein the target electronic device is a mobile device.

12. A non-transitory computer readable medium comprising computer readable program code, which when executed by a computer processor enables the computer processor to perform a method for configuring electronic devices, the method comprising:

obtaining a user profile for a user;

obtaining electronic device information for an electronic device associated with the user;

determining a circle of interest (COI) using the user profile and the electronic device information;

presenting, based on the COI, a set of questions to the user;

receiving, in response to the presenting, a set of answers from the user;

generating, based on the set of answers, a plurality of tasks;

validating the plurality of tasks using a large language model (LLM); and based on the validating, initiating execution of the plurality of tasks on the electronic device, wherein the electronic device is configured after the plurality of tasks are executed.

13. The non-transitory computer readable medium of claim 12, wherein the user profile comprises an application profile and an operating system profile, wherein the application profile specifies user-application interaction preferences for at least one application executing on a second electronic device used by the user, and wherein operating system profile specifies user-device interaction preferences for the second electronic device used by the user.

14. The non-transitory computer readable medium of claim 13, wherein the user-application interaction preferences specify a notification setting in the at least one application.

15. The non-transitory computer readable medium of claim 13, wherein the user-device interaction preferences specify a scrolling preference on the second electronic device.

16. The non-transitory computer readable medium of claim 12, further comprising:

prior to obtaining the user profile:

monitoring user inputs and preferences of the user on the second electronic device;

creating a natural language description of the user inputs and preferences; and storing the natural language description in the user profile associated with the user.

17. The non-transitory computer readable medium of claim 16, further comprising:

prior to storing the natural language description:

validating the natural language description of the user inputs and preferences using the large language model (LLM), wherein the validating determines whether the natural language description of the user inputs and preferences comprises any hallucinations, and wherein once the natural language description of the user inputs and preferences are validated, they may be stored in the user profile.

18. The non-transitory computer readable medium of claim 12, wherein the set of questions is generated by the large language model.

19. The non-transitory computer readable medium of claim 18, wherein at least one question in the set of questions is a trick question to confirm that the user is not inputting improper data.

20. A system for configuring electronic devices, the system comprising:

an electronic device; and a reconciliation module operatively connected to the electronic device and comprising a processor and memory, and configured to:

obtain a user profile for a user;

obtain electronic device information for the electronic device associated with the user;

determine a circle of interest (COI) using the user profile and the electronic device information;

present, based on the COI, a set of questions to the user;

receive, in response to the presenting, a set of answers from the user;

generate, based on the set of answers, a plurality of tasks;

validate the plurality of tasks using a large language model (LLM); and based on the validating, initiate execution of the plurality of tasks on the electronic device, wherein the electronic device is configured after the plurality of tasks are executed.

* * * * *